United States Patent [19]
Lynch

[11] 3,949,165
[45] Apr. 6, 1976

[54] NOISE IMMUNE CLAMP CIRCUIT
[75] Inventor: Edward I. Lynch, Portsmouth, Va.
[73] Assignee: General Electric Company, Portsmouth, Va.
[22] Filed: Nov. 12, 1974
[21] Appl. No.: 523,020

[52] U.S. Cl. ............... 178/7.3 DC; 178/DIG. 12
[51] Int. Cl.[2] ................................. H04N 5/18
[58] Field of Search . 178/7.5 DC, 7.3 DC, DIG. 26; 358/34

[56] References Cited
UNITED STATES PATENTS

| | | | |
|---|---|---|---|
| 3,324,405 | 6/1967 | Corney | 178/7.3 DC |
| 3,526,710 | 9/1970 | Martin | 178/DIG. 26 |
| 3,700,794 | 10/1972 | Loose | 178/DIG. 26 |

Primary Examiner—Robert L. Richardson

[57] ABSTRACT

A transistor provides a hard clamp circuit for the video signal in a television receiver that is substantially noise immune. Such a clamp circuit is rendered increasingly immune to noise in proportion to increased frequencies above the sync frequency of the video signal by bypassing the emitter-base clamp diode with a capacitor. The effects of the base circuit impedance on the clamp impedance is reduced by employing a high beta transistor. In this manner impedance means may be employed to limit the loading of the video signal by the capacitor. Means are also provided to overcome any voltage supply irregularities from affecting the DC restored video signal so that substantially 100% DC restoration is achieved.

6 Claims, 2 Drawing Figures

3,949,165

NOISE IMMUNE CLAMP CIRCUIT

BACKGROUND OF THE INVENTION

The present invention relates to a clamp circuit for a television receiver to be employed in an AC coupled video circuit to restore the DC level of the video signal prior to its being applied to the cathode ray tube.

It has been found in the design of the video processing circuits of the television receivers that the DC level of the video signal can be affected by power supply irregularities as well as amplifier non-linearities and changes with temperature and time. The normal solution to overcome DC level change is to AC couple the video signal and then restore the DC level just before the video signal is applied to the cathode ray tube. The effect of not having the DC level of the video signal applied to the cathode ray tube representative of the DC level of the video signal as received by the receiver is that the black level of the picture is not correct and blacks appear as gray or grays appear as black depending upon the polarity of the DC error. The scheme that is employed to avoid such errors is to clamp the video signal to the desired DC voltage level. Thus, for example, the sync tip of the video signal or the back porch of the horizontal sync interval is ofen clamped to the desired DC level.

Clamp circuits have not proven to be a problem free solution to controlling the DC level of the video signal. It is desirable to provide a stiff clamp, namely one that clamps the video signal closely to the desired voltage level. Thus, normally a diode clamp with low series resistance is employed to achieve this purpose. However, it has been found that the low resistance necessary for a simple diode hard clamp, renders the clamp sensitive to noise and also video signal having excursions exceeding sync tip. In many receivers the solution to the noise problem has been to soften the clamp by adding series resistance. The result is that in the reproduced picture, tramsitted dark colors and dark grays are rendered black on bright scenes while black objects and dark colors are reproduced too bright during the reproduction of dark scenes.

It is accordingly an object of the present invention to provide a stiff clamp circuit for a television receiver that is noise immune.

Another object of the present invention is to eliminate the affect of power supply variation on the video circuitry responsive to the clamped video signal to insure the DC level of the video remains constant as clamped.

These and other objects are achieved by the utilization of a transistor clamp circuit comprising a transistor with its emitter-collector path connected to the video circuit and the base electrode to a source of DC voltage, such that the emitter-base diode of the transistor serves to clamp the video signal for example by its sync tip to the DC voltage set by the source of DC voltage. A capacitor is connected between the base and the video circuit and is selected in conjunction with the base to AC ground resistance of the transistor to progressively short circuit the emitter-base diode with increased frequency above the sync frequency. The resistance of the voltage source and additional resistance in the base circuit insure that the capacitor will not load down the video circuit. The beta of the transistor is selected to be high so that all such resistance has minimal affect upon the stiffness of the clamp.

To insure that the video signal remains clamped to the voltage set in the base circuit of the transistor clamp, means are provided to insure that the portion of the video circuit subsequent to the clamp is not subjected to power supply variations. Such means, for a non-regulated power supply, may comprise resistive coupling of the supply into the video circuit in the form of open loop feedback to offset any such variations.

BRIEF DESCRIPTION OF THE DRAWINGS

The invention together with its objects and features and its preferred mode of operation may be better understood with reference to the drawings, wherein.

DETAILED DESCRIPTION

Figure 1:
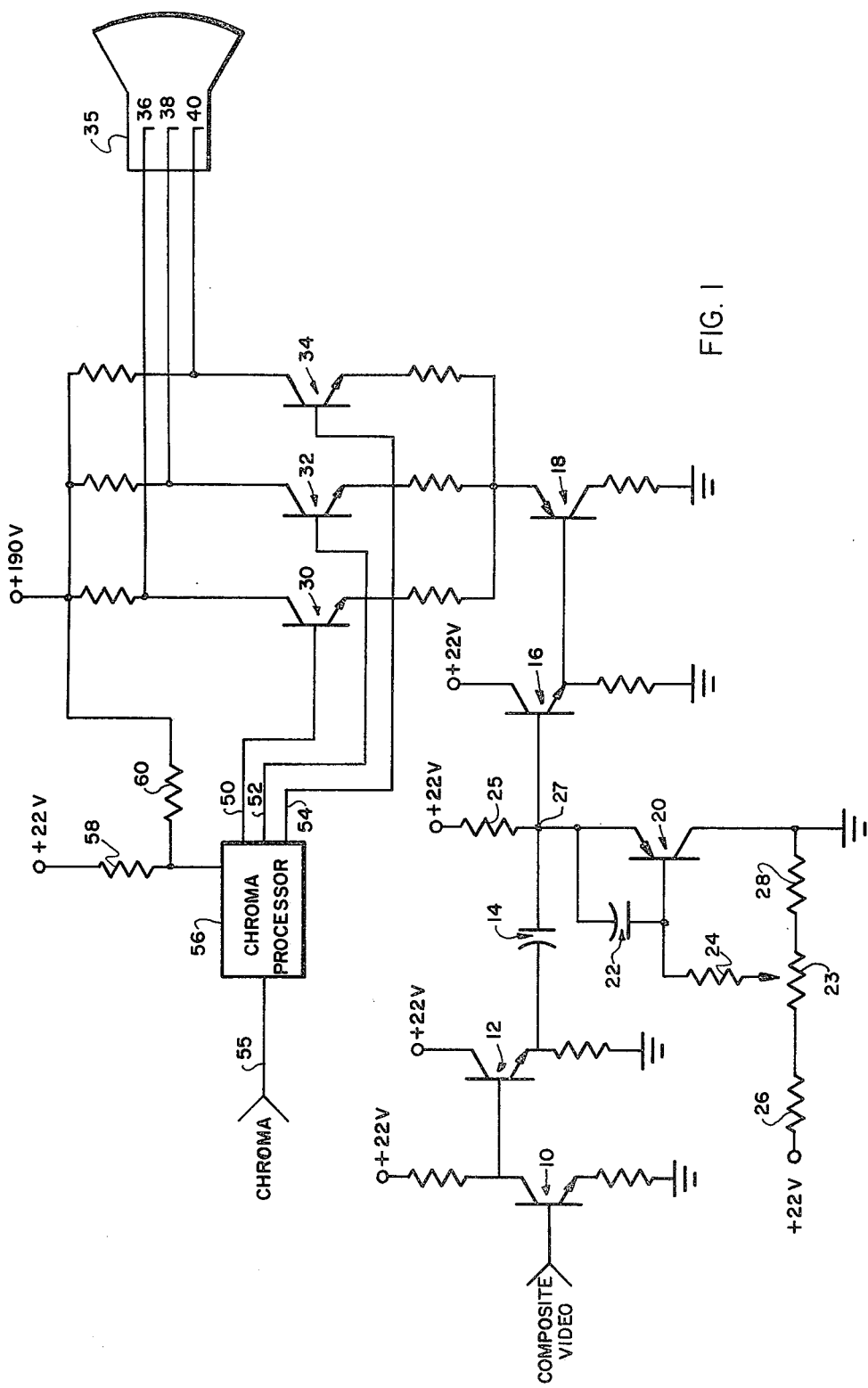
FIG. 1 is a partial circuit and partial block diagram of a portion of a television receiver including the clamp circuit of the present invention used to clamp the positive sync of the video signal.

Referring now to FIG. 1 there is shown a portion of the video processing circuitry common to many color television receivers. It should be noted that while video processing circuitry for color television receivers is shown, the invention is readily applicable to a monochrome television receiver. Two portions of the video processing circuit are shown, the luminance channel and the chrominance channel. The chrominance channel comprises chroma processor 56 which separates the composite chrominance information into separate color difference signals R-Y, B-Y and G-Y appearing on output leads 50, 52 and 54. This color difference information is applied to matrix amplifiers 30, 32 and 34 to combine the luminance and chrominance information to obtain the red, green and blue drive signals which are applied to the cathodes 36, 38 and 40 of the cathode ray tube 35. Amplifier 18 supplies the luminance information to the matrix circuit.

The chroma processor 56 is shown in block form since it may comprise any one of many known circuits which separate the composite chrominance signal into color difference signals. Such a circuit, for example, is shown and described in Linear Integrated Circuits Data Book, published by Motorola Semiconductor Products, Inc., Third Edition, November 1973, pages 8–46 to 8–50.

The luminance channel processes the composite video signal as detected by the detector (not shown) and includes amplifier circuits such as the amplifier 10 and emitter-follower 12. Capacative coupling is provided by capacitor 14. The remainder of the luminance channel includes emitter-follower 16 and amplifier 18.

As was previously mentioned, amplifiers in the video circuit often are subject to changing DC characteristics with temperature and age as well as power supply fluctuations and accordingly capacitative coupling as represented by the capacitor 14 is employed. Such coupling of course requires that the DC in the video signal be properly restored before it is applied to the cathode ray tube. A stiff clamp circuit in accordance with the present invention including the transistor 20 is provided for this purpose. The emitter of transistor 20 is connected to the video circuit at point 27 and to the +22 volt supply through resistor 25. The collector of transistor 20 is connected to the other terminal of the 22 volt power supply which is denoted in the figure as ground so that the primary current flow is from the +22 volt supply through the resistor 25 through the emitter collector path to ground. A capacitor 22 connected also to point 27 and to the base of the transistor provides noise immunity to the clamp circuit. The base electrode of the transistor is also connected to a DC supply fashioned by resistors 26 and 28 and potentiometer 23 connected in series between the 22 volt supply and ground. Potentiometer 23 enables the DC supply to be adjustable and can serve as a black level control for the receiver, or may be designated by its more common name — a brightness control.

The clamping action provided by transistor 20 is achieved in the following manner. The emitter-base diode controls the degree of current flow in the emitter-collector path, so that capacitor 14 is discharged until equilibrium with the voltage set in the base circuit is realized. The charge of capacitor 14 is via resistor 25 from the 22 volt supply. In this manner the low impedance, high current emitter-collector path provides a hard clamp under the control of the higher impedance noise immune emitter-base diode circuit.

The equivalent resistance between the base of transistor 20 and AC ground, composed of resistors 23, 24, 26 and 28, combines with capacitor 22 to provide several features of the invention. These resistences provide the discharge path for capacitor 22. In addition, these resistences limit the propensity of the capacitor to load the video circuit. Also the resistors combine with the capacitor to form a short circuit of high frequency video and noise components across the emitter base diode of the clamp without modifying the signal applied to the clamp or shorting these frequencies to ground. The value of the capacitor is selected so that all frequencies above the video sync frequency are passed. These features are realized without loss of the stiffness of the clamp by selecting a high beta transistor so that the resistance is minimally reflected into the emitter-collector primary current path.

It is recognized that the video signal applied to transistor 16 and passed on into the matrix circuit transistors is correctly transferred if the 190 volt power supply is regulated or if unregulated the variations thereof are kept from affecting the DC operating level of these circuits. Accordingly in the unregulated power supply case, means are provided to eliminate the affect of the variations in the 190 volt supply on the stages of the video circuit subsequent to the clamped DC video signal. Such means include the resistor 60 which has been added to the circuit and coupled into the supply voltage for the chroma processor. By adding appropriately valued resistor 60 in conjunction with modifying the value of resistor 58 a feedback circuit is created so that the variations are fed into the base leads of transistors 30, 32 and 34. In this manner a portion of the variations in the 190 voltage supply is applied to the base of matrix amplifiers 30, 32 and 34 so that the outputs of these transistors are free from such variations.

The means for controlling the DC level of the video circuitry responsive to the clamped signal can take on many forms other than the feedback loop shown in FIG. 1. For example, constant current controlling means could be employed in the output transistor stage to insure the DC level of the clamp circuit is maintained. Of course, where a regulated power supply is employed no other means are required.

Figure 2:
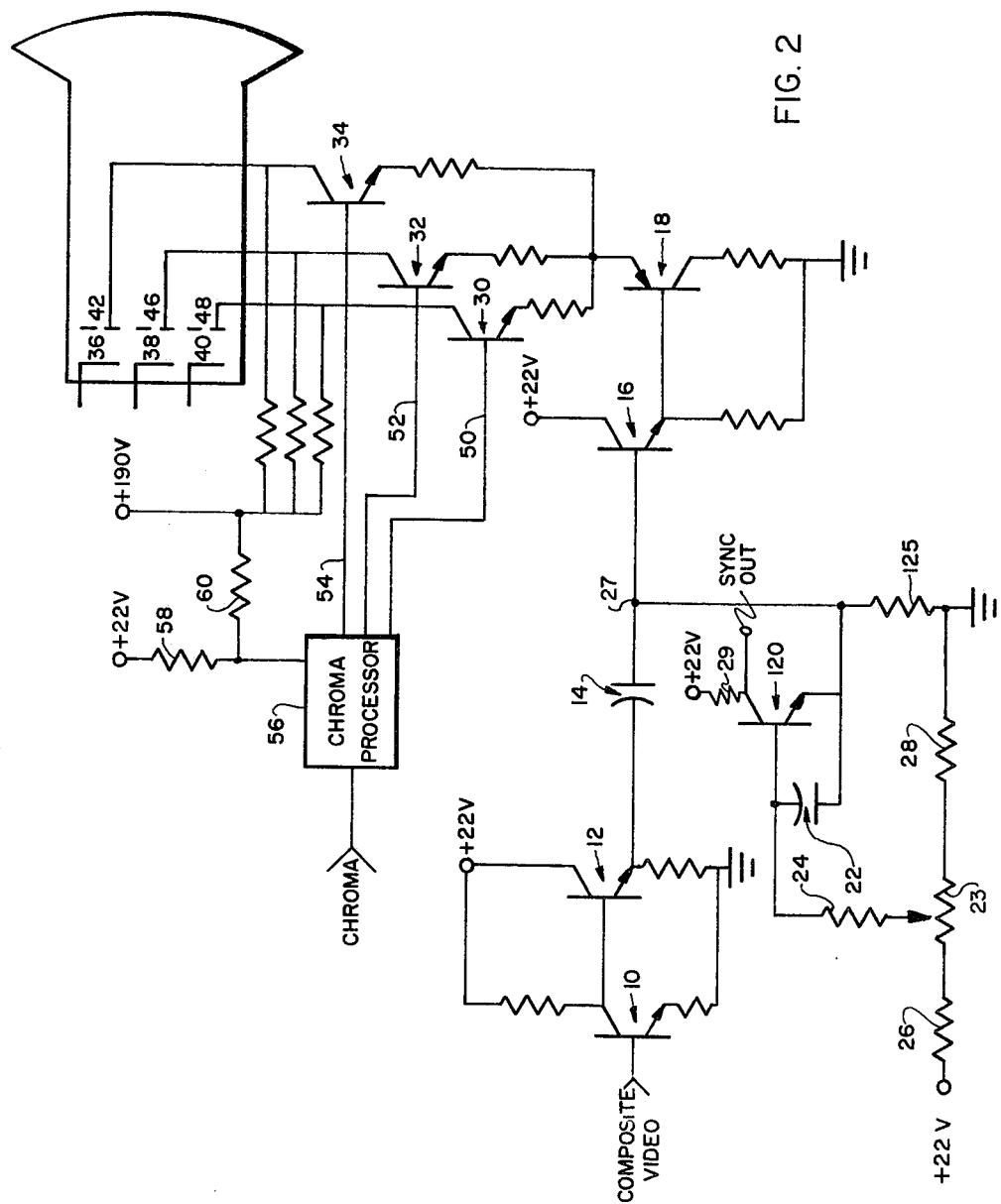
FIG. 2 is substantially similar to FIG. 1, showing a transistor clamp circuit for clamping a negative sync video signal.

Referring now to FIG. 2, a similar circuit to that of FIG. 1 is shown. FIG. 2 shows a circuit suitable for clamping negative sync. The same reference numerals are used to designate the same parts as shown in FIG. 1. The clamp transistor 120 is connected by its emitter terminal directly to the point 27. The emitter is also returned to ground through resistor 125. The collector of the NPN transistor in this case being returned to the positive 22 volt supply through a resistor 29. The capacitor 22 is again connected between point 27 and the base of transistor 120, the base terminal being connected to the same voltage divider and potentiometer circuit to provide an adjustable sorce of DC voltage.

The remainder of the circuit shown in FIG. 2 is substantially identical to that shown in FIG. 1 with the exception that the matrix amplifier comprising transistors 30, 32 and 34 and transistor 18 is now connected to the grids 42, 46 and 48 of the cathode ray tube instead of the cathodes as shown in FIG. 1.

The resistor 29 which could also be added in the collector circuit of transistor 20 in FIG. 1, is for the purpose of developing a point for deriving a noise free sync signal. Ideally the value of this resistor is low to minimize the effect of this resistor on the stiffness of the clamp.

It is noted that capacitor 22 not only renders the clamp circuit of the present invention insensitive to noise but also to video signals which could have amplitude excursions exceeding the sync tip amplitude. Due to the video signal having frequencies sufficiently higher than the sync frequency the video is bypassed by the capacitor and the clamp acts on the sync tip and not on other higher frequency excessive excursions.

What is claimed and desired to be secured by Letters Patent of the U.S. is:

1. In a television receiver having a video transfer circuit for applying the detected video signal to the cathode ray tube and including active devices powered by power supply means, a video DC voltage level determining circuit comprising:

transistor means having an emitter-collector circuit connected to said video transfer circuit and a base circuit connected to a source of DC voltage, such that said video signal is clamped by said transistor means to the DC voltage level determined by said source of DC voltage, means interconnecting said base circuit with said video transfer circuit to render said transistor means substantially immune to noise and video components having a frequency higher than the sync frequency of said video signal, and means in circuit with said power supply means to minimize the affect of variations in said power supply means on those active devices in said video transfer circuit responsive to the DC clamped video signal so that the DC level of said video signal as set by said transistor means is maintained.

2. The invention recited in claim 1 wherein said transistor means comprises a single transistor having its emitter connected to said video transfer circuit and its base connected to said source of DC voltage, such that the emitter-base diode of said transistor clamps said video transfer circuit to the DC voltage level determined by said source of DC voltage, and said means interconnecting said base circuit with said video transfer circuit is a capacitor connected between said emitter and base.

3. The invention recited in claim 2 wherein said capacitor is selected so that noise and video components having frequencies above the sync frequency of said video signal bypasses said emitter-base diode to render said transistor substantially immune to such noise and video components.

4. The invention recited in claim 3 wherein said means to minimize the effects of variations comprises resistor means coupling power supply variations of proper polarity and magnitude into said video transfer circuit to cancel the affect of such variations on the DC level of said video signal.

5. The invention recited in claim 1 wherein said emitter-collector circuit includes output means providing a source of sync signals free of noise and video components having frequencies above said sync frequency.

6. The invention recited in claim 5 wherein said transistor means has its emitter connected to said video transfer circuit, its collector connected to said source of bias voltage by a collector resistor comprising said output circuit means, said collector resistor being sufficiently small in value so as to minimally affect the stiffness of the clamp, said source of sync signals being obtained from said collector resistor, and the base of said transistor means being connected to said source of DC reference voltage such that the emitter-base diode of said transistor means provides the clamping action for said transistor means, and said means interconnecting said base circuit with said video transfer circuit is a capacitor connected between said emitter and base.

* * * * *